US009436375B2

(12) United States Patent
Cho et al.

(10) Patent No.: US 9,436,375 B2
(45) Date of Patent: Sep. 6, 2016

(54) METHOD OF RECOGNIZING MULTI-GAZE AND APPARATUS THEREFOR

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 14/167,446

(22) Filed: Jan. 29, 2014

(65) Prior Publication Data

US 2015/0095844 A1 Apr. 2, 2015

(30) Foreign Application Priority Data

Sep. 30, 2013 (KR) ........................ 10-2013-0116090

(51) Int. Cl.
*G06F 3/0485* (2013.01)
*G06F 3/0488* (2013.01)
*G06F 3/01* (2006.01)
*G06F 3/03* (2006.01)

(52) U.S. Cl.
CPC ............. *G06F 3/0485* (2013.01); *G06F 3/013* (2013.01); *G06F 3/0304* (2013.01); *G06F 3/0488* (2013.01); *G06F 2203/0381* (2013.01)

(58) Field of Classification Search
CPC ....... G06F 3/013; G06F 3/0485; G06F 3/017
See application file for complete search history.

(56) References Cited

U.S. PATENT DOCUMENTS

| 7,429,108 | B2 | 9/2008 | Rosenberg | |
| 7,877,460 | B1* | 1/2011 | Brouwer | G06Q 10/10 709/205 |
| 8,260,915 | B1 | 9/2012 | Ashear | |
| 2009/0322678 | A1* | 12/2009 | Lashina | G09F 27/00 345/158 |
| 2010/0097338 | A1* | 4/2010 | Miyashita | G06F 3/04883 345/173 |
| 2011/0141010 | A1 | 6/2011 | Sakata et al. | |
| 2011/0304606 | A1* | 12/2011 | Walsh | G06F 3/013 345/214 |
| 2012/0146891 | A1 | 6/2012 | Kalinli | |

(Continued)

FOREIGN PATENT DOCUMENTS

EP 2613224 A2 7/2013
WO WO 2010/143377 A1 12/2010

*Primary Examiner* — Ajay Bhatia
*Assistant Examiner* — Justin R Blaufeld
(74) *Attorney, Agent, or Firm* — Birch, Stewart, Kolasch & Birch, LLP

(57) ABSTRACT

A multi-gaze recognition device according to one embodiment of the present specification includes a display module configured to display a display area containing a visual content capable of being scrolled, an input module configured to receive an input of a touch gesture signal to scroll the visual content, an image acquisition module configured to acquire an image in front of a device, and an analysis module configured to scroll the visual content using a first gaze and a second gaze detected from the image acquired in front of the device. The first gaze determines a maximum amount of a scroll area to scroll the visual content, the second gaze determines whether an event initiating the scroll occurs, and the analysis module is configured to scroll the visual content according to the touch gesture signal in a manner of judging whether the second gaze is within a scroll initiation area to initiate the scroll. The display area includes a first display area where an amount of the first area is determined according to the scroll area, the first gaze, and the second gaze. The first display area may include the scroll initiation area.

19 Claims, 7 Drawing Sheets

(56) References Cited

U.S. PATENT DOCUMENTS

| | | | |
|---|---|---|---|
| 2012/0151351 A1* | 6/2012 | Kilroy | G06Q 30/02 715/733 |
| 2012/0210203 A1* | 8/2012 | Kandekar | G06F 17/241 715/230 |
| 2012/0278082 A1* | 11/2012 | Borodin | G06F 17/30873 704/260 |
| 2014/0268054 A1* | 9/2014 | Olsson | G06K 9/00604 351/209 |

* cited by examiner

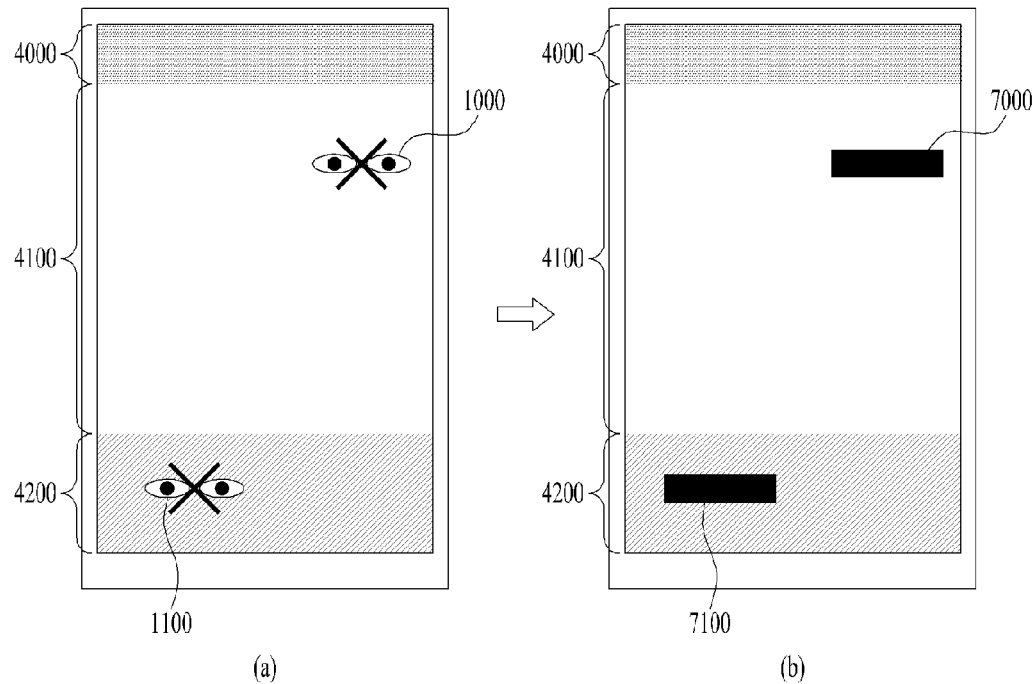
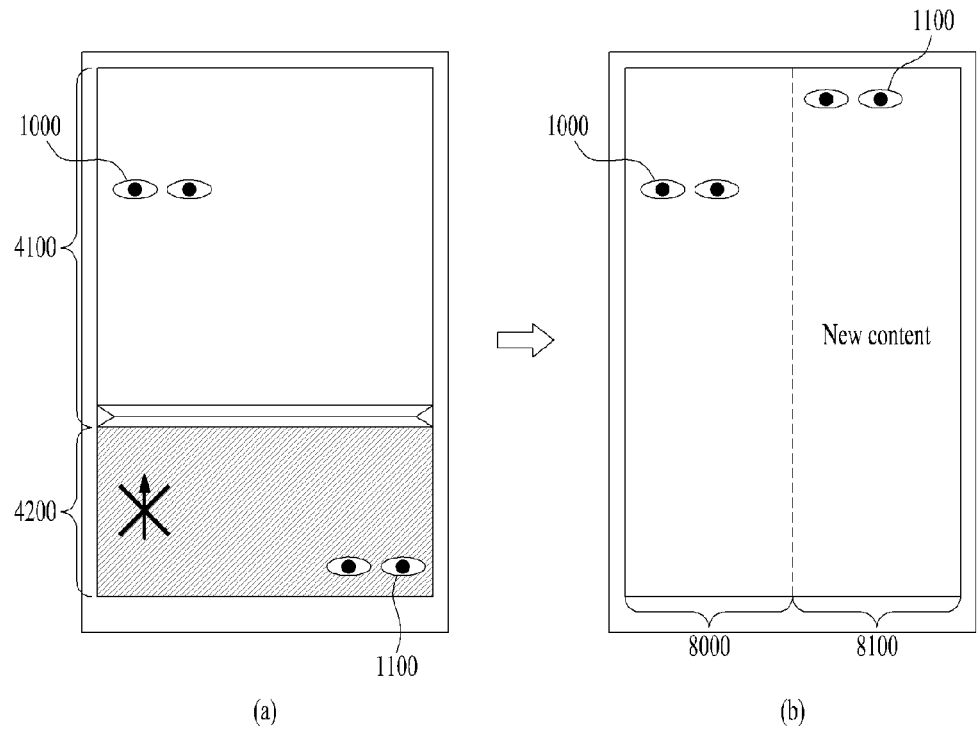

(a)          (b)

METHOD OF RECOGNIZING MULTI-GAZE AND APPARATUS THEREFOR

This application claims the benefit of the Korean Patent Application No. 10-2013-0116090, filed on Sep. 30, 2013, which is hereby incorporated by reference as if fully set forth herein.

BACKGROUND OF THE INVENTION

1. Field of the Invention

The present specification relates to a method of recognizing multi-gaze and an apparatus therefor, and more particularly, to a method of controlling a scroll of a visual content displayed in a display device using a plurality of gazes and a multi-gaze recognition device therefor.

2. Discussion of the Related Art

As a touch screen technology has been developed, importance of a user-friendly user interface technology using the touch screen technology in such a display device as a cellular phone, a tablet PC, a digital television, and the like is rapidly growing. This aims for not a simple design change but optimization of user convenience and has brought various application developments based on convenience of a touch screen input.

Recently, technologies for controlling operation of a display device based on such various senses as a sense of vision, a sense of hearing and the like of a user have the spotlight as well as a technology using a sense of touch of a user. In case of controlling a display device using various senses of a user, more user-friendly user interface can be provided.

In particular, in case of a technology based on a sense of vision, since a display device can be controlled by a user in a manner of actively reflecting a service condition of the display device, user convenience can be maximized.

SUMMARY OF THE INVENTION

Accordingly, the present specification is directed to an apparatus and method thereof that substantially obviate one or more problems due to limitations and disadvantages of the related art.

In displaying a visual content, a display device can scroll the visual content according to a touch gesture signal using a sense of touch of a user. Since the touch gesture signal is inputted by the user, the visual content can be scrolled according to intention of the user. Yet, as various display devices have been developed, a plurality of users may watch the visual content together. In this case, since the speed of reading the visual content varies according to each user, if the visual content is scrolled by a touch gesture signal of a prescribed user, the other users may feel inconvenience.

In particular, in case of watching the visual content by a plurality of the users, it is necessary to provide visual content appropriate for each user even though the visual content is scrolled by a prescribed user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present specification, as embodied and broadly described, the present specification provides a multi-gaze recognition device and a method therefor capable of scrolling a visual content using a plurality of gazes of users. Specifically, the multi-gaze recognition device according to one embodiment of the present specification includes a display module configured to display a display area containing a visual content capable of being scrolled, an input module configured to receive an input of a touch gesture signal to scroll the visual content, an image acquisition module configured to acquire an image in front of a device, and an analysis module configured to scroll the visual content using a first gaze and a second gaze detected from the image acquired in front of the device. The first gaze determines a maximum amount of a scroll area to scroll the visual content, the second gaze determines whether an event initiating the scroll occurs, and the analysis module is configured to scroll the visual content according to the touch gesture signal in a manner of judging whether the second gaze is within a scroll initiation area to initiate the scroll. The display area includes a first display area where an amount of the first area is determined according to the scroll area, the first gaze, and the second gaze. The first display area may include the scroll initiation area.

According to a multi-touch recognition device according to one embodiment of the present specification, since a visual content can be provided according to a plurality of user gazes, user convenience can be maximized.

According to a multi-touch recognition device according to one embodiment of the present specification, since an operation of a display device can be controlled according to various user inputs, a more user-friendly user interface can be provided.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for an indicator according to one embodiment of the present specification;

FIG. 8 is a diagram for a display area according to a different embodiment of the present specification;

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

As mentioned in the foregoing description, when a visual content is displayed, a display device can scroll the visual content according to a touch gesture signal using a sense of touch of a user. In this case, since the touch gesture signal is inputted by a user, the visual content can be scrolled according to intention of the user. Yet, as various display devices have been developed, a plurality of users may watch the visual content together. In this case, since the speed of reading the visual content varies according to each user, if the visual content is scrolled by a touch gesture signal of a prescribed user, the other users may feel inconvenience.

In particular, in case of watching the visual content by a plurality of the users, it is necessary to provide visual content appropriate for each user even though the visual content is scrolled by a prescribed user.

Figure 1:
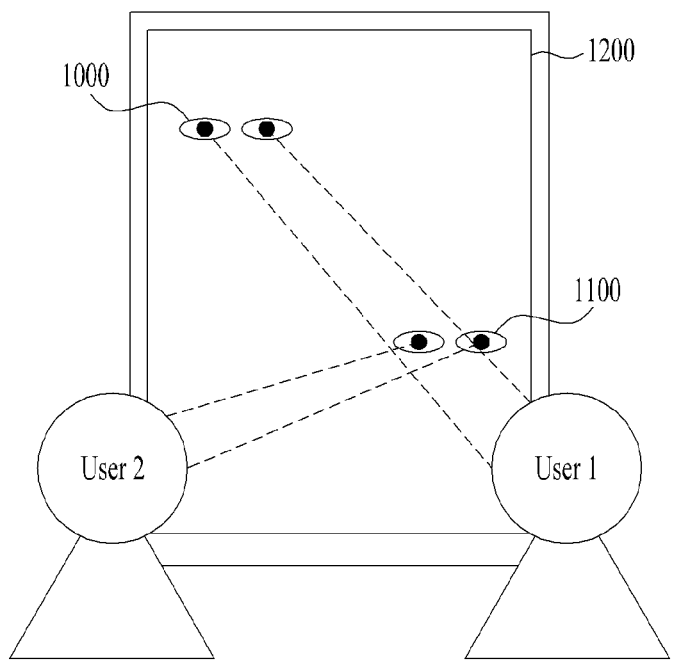
FIG. 1 is a diagram for a position of a gaze of each user when two users watch a visual content with a speed different from each other.

FIG. 1 is a diagram for a case that two users simultaneously watch a visual content displayed in a display device.

A display device according to one embodiment of the present specification includes a display unit capable of displaying a visual content. A type and size of the display unit may be non-limited.

When a user 1 and a user 2 simultaneously watch a visual content displayed in the display device, the speed of watching or the speed of reading the visual content of the user 1 and the user 2 may be different from each other. Hence, although the user 1 and the user 2 watch an identical visual content, a position of the visual content corresponding to each of a gaze of the user 1 and a gaze of the user 2 may vary.

FIG. 1 is a diagram for a case that two users watch a visual content with a different speed. FIG. 1 indicates a gaze position of each user. In the present specification, a gaze of the user 1 and a gaze of the user 2 are called a first gaze 1000 and a second gaze 1100, respectively. And, the display device according to one embodiment of the present specification can display a display area 1200 including a visual content. Regarding the display area 1200, it shall be explained in detail later.

As depicted in FIG. 1, the first gaze 1000 and the second gaze 1100 may correspond to specific positions in the display area 1200, respectively. As mentioned in the foregoing description, since the speed of watching the visual content of the user 1 is slower than the speed of watching the visual content of the user 2, a position of the first gaze 1000 can be located at the top of a position of the second gaze 1100 in the display area 1200.

In this case, while the visual content is watched by the user 1, the user 2 may finish watching the currently displayed visual content. In this case, if the user 2 scrolls the visual content to watch the visual content more, the user 1 may not watch the content since the visual content by which the user 1 is currently watching is scrolled at the same time. If the visual content is not scrolled while the user 1 watches the content, it may cause inconvenience of the user 2.

Hence, the present specification proposes a method of controlling a scroll of the visual content using gazes of the user 1 and the user 2 and a multi-touch recognition device therefor. In particular, the multi-touch recognition device and the method therefor according to one embodiment of the present specification determine an amount of scroll area capable of scrolling the visual content using a gaze of a slower user, i.e., the first gaze 1000 depicted in FIG. 1 among users and may be able to determine whether an event initiating a scroll occurs using the second gaze 1100. Detail content shall be described later.

Figure 2:
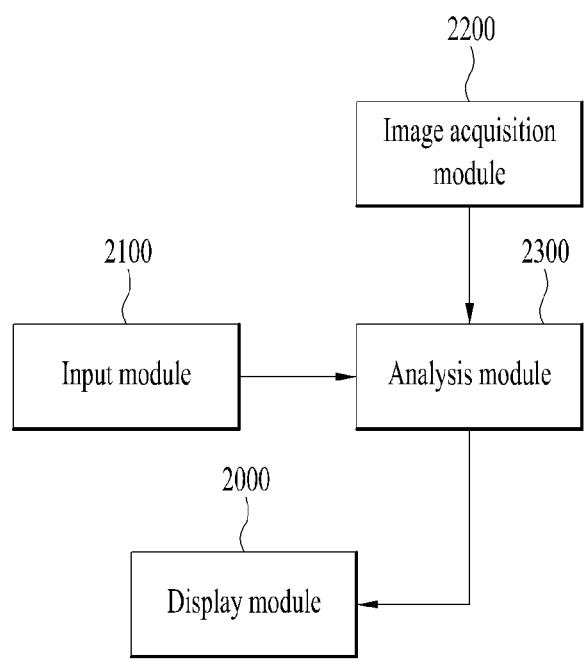
FIG. 2 is a diagram for a multi-touch recognition device according to one embodiment of the present specification.

FIG. 2 is a diagram for a multi-touch recognition device according to one embodiment of the present specification. The multi-touch recognition device according to one embodiment of the present specification can include a display module 2000, an input module 2100, an image acquisition module 2200, and an analysis module 2300. Following description is explained centering on the operation of each module.

The display module 2000 can display a display area including a visual content capable of being scrolled. The visual content according to one embodiment of the present specification may mean the visual content including a picture, a photo, a text, and the like.

The input module 2100 can receive an input of a touch gesture signal to scroll the visual content. The touch gesture signal may include a multi-touch gesture signal. Various touch gesture signals can be used according to intention of a designer. And, all or a part of the visual content according to the present specification can be scrolled according to a touch duration of the touch gesture signal.

The image acquisition module 2200 can acquire an image in front of a device. Subsequently, the analysis module 2300 detects gazes of both the user 1 and the user 2 from the image acquired in front of the device and can scroll the visual content using the detected gazes. As mentioned in the foregoing description, when the speed of watching the content of the user 1 and the speed of watching the content of the user 2 are different from each other, a position of a first gaze 1000 corresponding to the gaze of the user 1 can be located at the top of a position of a second gaze 1100 corresponding to the gaze of the user 2 in the display area 1200. A content included in the display area located at a position higher than a position of the first gaze 100 means that the content has already been watched by both the user 1 and the user 2. In particular, although the corresponding area is scrolled by one of the user 1 and the user 2, since the visual content displayed in the scrolled area is seen by all users, there is no inconvenience or problem in watching the displayed visual content. Hence, the analysis module 2300 according to one embodiment of the present specification can determine a maximum amount of the scroll area to scroll the visual content on the basis of the position of the first gaze 1000. In particular, the visual content included in the scroll area can be scrolled according to a touch gesture signal of a user within the determined maximum amount.

The analysis module 200 according to one embodiment of the present specification can determine whether an event initiating a scroll of a visual content occurs using a position of the second gaze 1100. In this case, if it is judged that the position of the second gaze 1100 is located within a scroll initiation area, the analysis module 1100 according to one embodiment of the present specification can initiate a scroll according to a touch gesture signal. The scroll initiation area according to one embodiment of the present specification corresponds to an area to initiate a scroll when a touch gesture signal of a user is inputted. The scroll initiation area may be included in the display area 1200. Detail content shall be described later.

Figure 3:
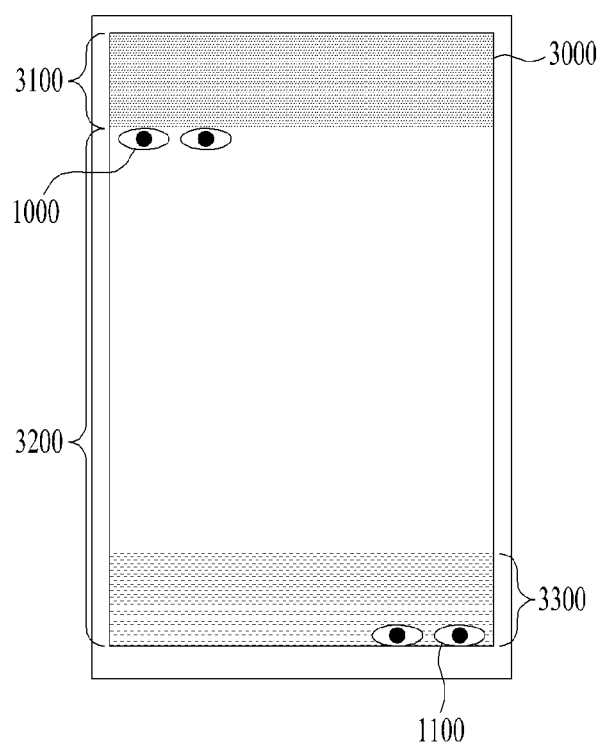
FIG. 3 is a diagram for a display area according to one embodiment of the present specification.

FIG. 3 is a diagram for a display area according to one embodiment of the present specification. A display area 3000 according to one embodiment of the present specification is indicated in FIG. 3. The display area 3000 according to one embodiment of the present specification can include the scroll area 3100 mentioned earlier in FIG. 2 and a first display area 3200. The first display area 3200 can include a scroll initiation area 3300. In the following description, each of the areas is explained.

As mentioned earlier in FIG. 1, the first gaze 1000 and the second gaze 1100 can be positioned at a part different from each other in the display area 3000. The analysis module 2300 mentioned earlier in FIG. 2 can determine a maximum amount of the scroll area to scroll a visual content using the first gaze 1000. The first display area 3200 is an area to provide a user of the first gaze 1000 with the visual content. An amount of the first display area 3200 is determined according to the positions of the first gaze 1000 and the second gaze 1100. And, the visual content included in the first display area 3200 may include the visual content already seen by the user of the second gaze 1100.

The scroll initiation area 3300 is an area to initiate a scroll when a touch gesture signal of a user is inputted by the touch gesture signal. The scroll initiation area 3300 may be included in the first display area 3200. Or, the scroll initiation area can be positioned at the top or bottom area of the first display area 3200 including a boundary of the first display area 3200. This is modifiable according to intention of a designer. And, the scroll initiation area 3300 and the scroll area 3100 can be simultaneously configured. The analysis module 2300 mentioned earlier in FIG. 2 judges whether the second gaze 1100 is positioned within the scroll initiation area 3300. If the second gaze 1100 is positioned within the scroll initiation area 3300, the analysis module can scroll the visual content according to a touch gesture signal. In this case, as mentioned in the foregoing description, the visual content can be scrolled within the maximum amount of the scroll area 3100.

Figure 4:
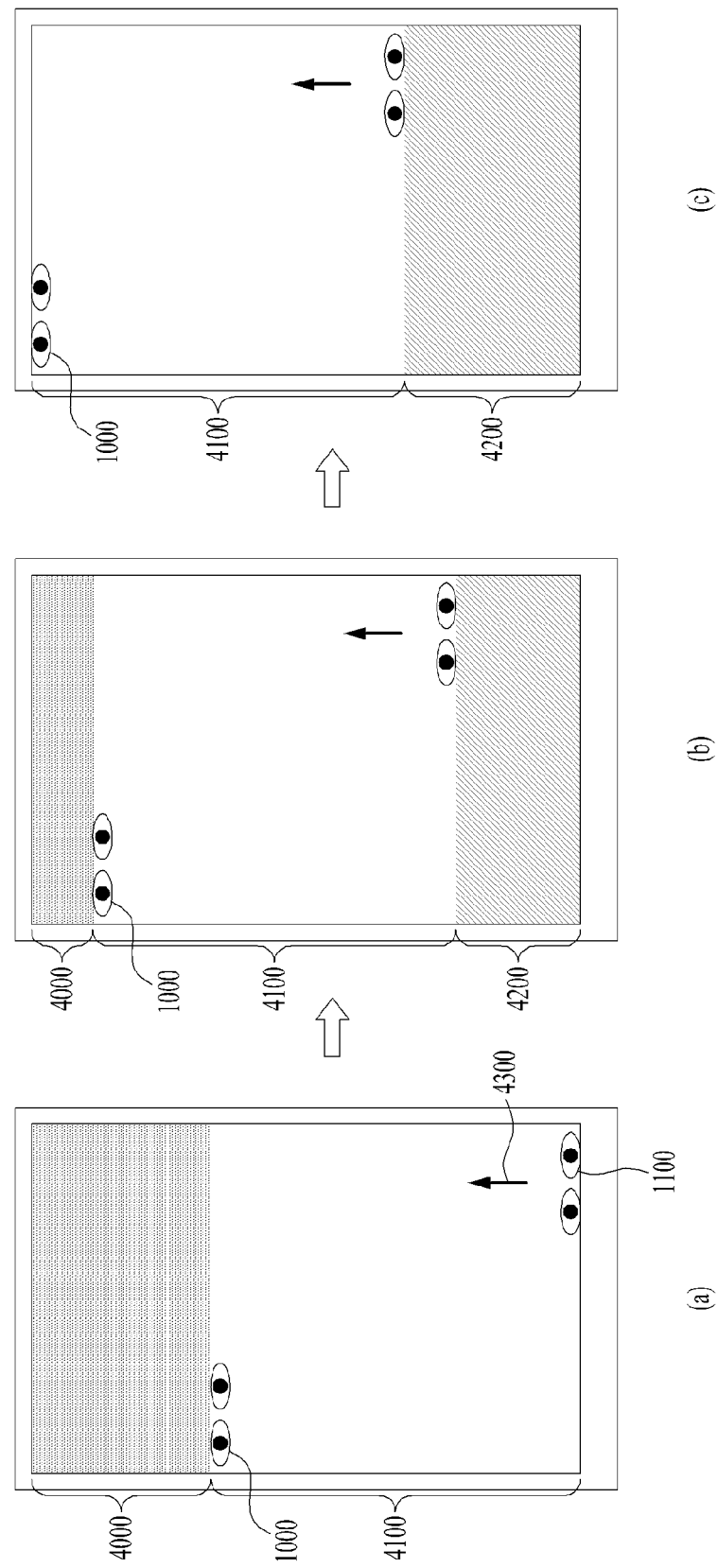
FIG. 4 is a diagram for a scroll operation of a multi-touch recognition device according to one embodiment of the present specification.

FIG. 4 is a diagram for a scroll operation of a multi-touch recognition device according to one embodiment of the present specification.

As mentioned earlier in FIG. 2, when the analysis module 2300 detects the first gaze 1000 and the second gaze 1100, FIG. 4 indicates a process of scrolling a visual content according to a touch gesture signal after the scroll area and the first display area are determined.

As depicted in FIG. 4(*a*), a display area can include a scroll area 4000 where a maximum amount of the scroll area is determined by the first gaze 1000. And, the display area can also include a first display area 4100 where an amount of the first display area is determined by the first gaze 1000 and the second gaze 1100. As mentioned earlier in FIG. 3, if it is judged that the second gaze 1100 is included in the scroll initiation area 3300, the analysis module 2300 according to one embodiment of the present specification can scroll the visual content according to a touch gesture signal 4300 of a user.

FIG. 4(*b*) indicates a process of scrolling a visual content according to the touch gesture signal 4300 of the user. As mentioned in the forgoing description, if the touch gesture signal 4300 is inputted, the analysis module 2300 can scroll the visual content as much as the maximum amount of the scroll area 4000 configured according to the first gaze 1000. As depicted in FIG. 4(*b*), when the visual content is scrolled, the amount of scroll area 4000 included in the display area is reduced according to the touch gesture signal 4300.

The display module 2000 according to one embodiment of the present specification can display a second display area 4200 including a visual content to provide a user of the second gaze 1100 with the visual content. The visual content provided to the user of the second gaze 1100 via the second display area 4200 may include content identical or contiguous to the visual content included in the first display area 4100. An amount of the second display area 4200 is identical to the amount of the scroll area 4000 reduced by the touch gesture signal. Hence, as depicted in FIG. 4(*b*), the sum of the amount of the scroll area 4000 displayed by the touch gesture signal 4300 and the amount of the second display area 4200 is identical to the amount of the scroll area 4000 depicted in FIG. 4(*a*).

FIG. 4(*c*) indicates a case that the visual content is scrolled up to the maximum amount of the scroll area 4000 by the touch gesture signal 4300. In this case, the second display area 4200 can be displayed as much as the maximum amount of the scroll area 4000.

Hence, since the multi-gaze recognition device according to one embodiment of the present specification can scroll the visual content using gazes of the users watching the visual content, although the speed of watching the visual content of each user is different from each other, each user can be provided with the visual content appropriate for each user.

Figure 5:
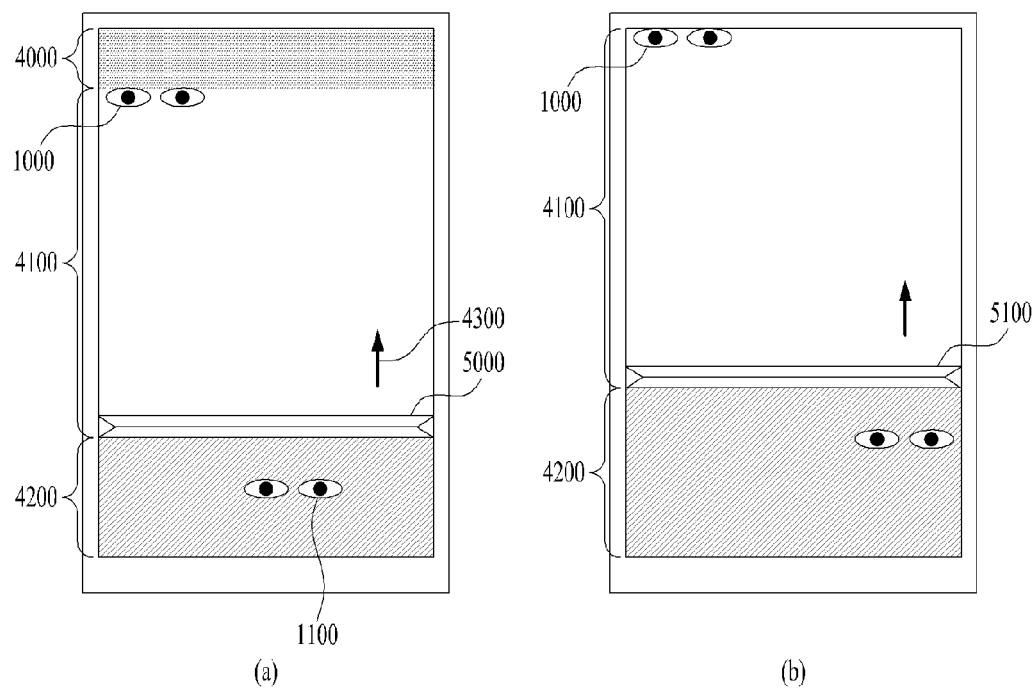
FIG. 5 is a diagram for a graphic image according to a first embodiment and a second embodiment of the present specification.
Figure 6:
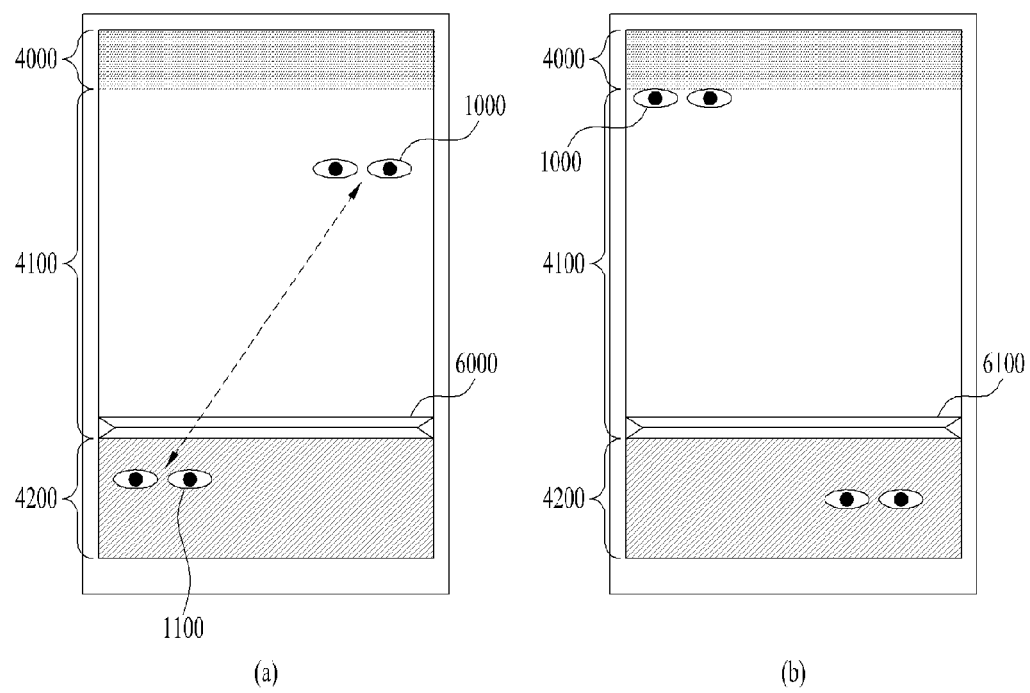
FIG. 6 is a diagram for a graphic image according to a third embodiment and a fourth embodiment of the present specification.

FIG. 5 to FIG. 6 is a diagram for a graphic image according to one embodiment of the present specification. As mentioned earlier in FIG. 2 to FIG. 4, the display module 2000 according to one embodiment of the present specification can display the first display area 4100 including the visual content for the user of the first gaze and the second display area 4200 for the user of the second gaze. And, the analysis module 2300 according to one embodiment of the present specification can independently scroll the visual contents included in the first display area 4100 and the visual content included in the second display area 4200 by the touch gesture of the user of the first gaze 1000 and the touch gesture of the user of the second gaze 1100, respectively.

In this case, if the speed of watching the visual content of the user of the second gaze 1100 is faster than the speed of watching the visual content of the user of the first gaze 1000, a difference may occur in content or a page number between the visual contents included in the first display area 4100 and the second display area 4200.

Hence, if the difference in content or page number between the visual contents included in the first display area 4100 and the second display area 4200 exceeds a predetermined value, the display module 2000 according to one embodiment of the present specification can display a graphic image like a folded visual content in a boundary between the first display area 4100 and the second display area 4200. And, the display module 2000 according to one embodiment of the present specification can display a graphic image like a folded visual content in the boundary between the first display area 4100 and the second display area 4200 irrespective of the difference in content or page number between the visual contents included in the first display area 4100 and the second display area 4200.

Hence, the multi-gaze recognition device according to one embodiment of the present specification can provide the visual content appropriate for each user via visually divided display areas.

If the difference in content or page number between the visual contents included in the first display area 4100 and the second display area 4200 increases, thickness of the graphic image like the folded visual content may be more thickened. And, if the difference in content or page number between the visual contents included in the first display area 4100 and the second display area 4200 decreases because the speed of watching the visual content of the user of the first gaze 1000 becomes faster, the thickness of the graphic image like the folded visual content may decrease.

And, if the difference in content or page number between the visual contents included in the first display area 4100 and the second display area 4200 becomes smaller than the aforementioned predetermined value, the display module 2000 according to one embodiment of the present specification does not display the graphic image like the folded visual content.

The display module 2000 according to one embodiment of the present specification can display the graphic image like the folded visual content according to a first embodiment to a fourth embodiment as follows. The first and the second embodiment can be applied according to an input of a touch gesture signal of a user. The third and the fourth embodiment can be applied irrespective of whether a touch gesture signal of a user is inputted. Each of the embodiments is explained in the following description.

First Embodiment the display module 2000 according to one embodiment of the present specification can display the graphic image to distinguish the first display area 4100 from the second display area 4200 when a touch gesture signal of a user is inputted and then the second display area 4200 is displayed.

Second Embodiment if a visual content is scrolled as much as a maximum amount of the scroll area 4000 by a touch gesture signal of a user, the display module 2000 according to one embodiment of the present specification can display the graphic image to distinguish the first display area 4100 from the second display area 4200.

Third Embodiment if the first display area 4100 and the second display area 4200 are displayed together, the display module 2000 according to one embodiment of the present specification can display the graphic image according to a distance between a position of a first gaze 1000 in the first display area 4100 and a position of a second gaze 1100 in the second display area 4200. Detail content shall be described later.

Fourth Embodiment when the first display area 4100 and the second display area 4200 are displayed together, if a position of the first gaze 1000 corresponds to a border line of the top of the first display area 4100, the display module 2000 according to one embodiment of the present specification can display the graphic image.

In case of following the first embodiment to the fourth embodiment, the first display area 4100 and the second display area 4200 can be divided by the aforementioned graphic image. Hence, the analysis module 2300 according to one embodiment of the present specification can scroll the visual contents included in the first display area and the second display area with a speed different from each other.

FIG. 5 and FIG. 6 are explained in the following description.

FIG. 5(*a*) is a diagram for a graphic image according to the first embodiment. A display area according to the first embodiment can include a scroll area 4000, a first display area 4100, and a second display area 4200. As mentioned in the foregoing description, if a touch gesture signal 4300 of a user is inputted, the display module 2000 according to one embodiment of the present specification can display a graphic image 5000 like a folded visual content. As mentioned in the foregoing description, if the difference in content or page number between the visual contents included in the first display area 4100 and the second display area 4200 becomes smaller than the predetermined value, the graphic image 5000 according to the first embodiment may not be displayed.

FIG. 5(*b*) is a diagram for a graphic image according to the second embodiment. The display area according to the second embodiment can include a first display area 4100 and a second display area 4200. As mentioned in the foregoing description, since the second embodiment corresponds to a case that a visual content is scrolled as much as a maximum amount of a scroll area, the scroll area is not displayed. Hence, as mentioned in the foregoing description, if the visual content is scrolled as much as the maximum amount of the scroll area according to a touch gesture signal of a user, the display module 2000 according to the second embodiment can display a graphic image 5100 like a folded visual content. As mentioned in the foregoing description, if the difference in content or page number between the visual contents included in the first display area 4100 and the second display area 4200 becomes smaller than the predetermined value, the graphic image 5000 according to the first embodiment of the present specification may not be displayed.

As mentioned earlier, the visual contents included in the first display area 4100 and the second display area 4200, respectively depicted in FIG. 5(*a*) and FIG. 5(*b*) can be scrolled with a speed different from each other.

FIG. 6 is a diagram for a graphic image according to a third embodiment and a fourth embodiment of the present specification.

FIG. 6(*a*) is a diagram for a graphic image according to a third embodiment. A display area according to the third embodiment can include a first display area 4100 and a second display area 4200. A scroll area may or may not be included according to a touch gesture signal input.

The analysis module 2300 according to the third embodiment can measure a distance between a position of a first gaze 1000 in the first display area 4100 and a position of a second gaze 1100 in the second display area 4200. After measuring the distance, if the distance between the position of the first gaze 1000 and the position of the second gaze 1100 is greater than a predetermined value, the display module 2000 according to the third embodiment can display the aforementioned graphic image.

FIG. 6(*b*) is a diagram for a graphic image according to the fourth embodiment. A display area according to the fourth embodiment can include a first display area 4100 and a second display area 4200. A scroll area may or may not be included according to a touch gesture signal input.

The analysis module 2300 according to the fourth embodiment can judge whether a position of a first gaze 1000 corresponds to a top boundary of the first display area 4100. After judging, if the position of the first gaze 1000 corresponds to a border line of the top of the first display area 4100, the display module 2000 according to the fourth embodiment can display the aforementioned graphic image.

FIG. 7 is a diagram for an indicator according to one embodiment of the present specification.

As mentioned in the foregoing description, the analysis module 2300 according to one embodiment of the present specification can control a visual content in a manner of detecting a first gaze 1000 and a second gaze 1100 from an image acquired in front of a device by the image acquisition module 2200. The analysis module 2300 can detect whether the first gaze 1000 or the second gaze 1000 is disappeared in a manner of acquiring an image in front of the device with a prescribed cycle. As a result of detecting, if it is judged that the first gaze 1000 or the second gaze 1100 is disappeared, the display module 2000 according to one embodiment of the present specification can display an indicator indicating a last position corresponding to a lastly detected first gaze 1000 or a lastly detected second gaze 1100.

FIG. 7(*a*) indicates a case that the analysis module 2300 according to one embodiment of the present specification judges that the first gaze 100 does not exist in the first display area 4100 or the second gaze 1100 does not exist in the second display area 4200. The analysis module 2300 according to one embodiment of the present specification can simultaneously detect whether the first gaze 1000 and the second gaze 1100 exist. Or, the analysis module 2300 according to one embodiment of the present specification can sequentially detect whether the first gaze 1000 and the second gaze 1100 exist. This is modifiable according to intention of a designer.

Subsequently, as depicted in FIG. 7(*b*), the display module 2000 according to one embodiment of the present specification can display indicators 7000/7100 indicating last positions corresponding to the lastly detected first gaze 1000 and the lastly detected second gaze 1100 in the first display area 4100 and the second display area 4200, respectively. The indicators 7000/7100 according to one embodiment of the present specification can be represented by at least one selected from the group consisting of a line, light and shade, number, and a graphic. This is modifiable according to intention of a designer. The indicators 7000/7100 according to one embodiment of the present specification can be simultaneously or sequentially displayed depending on whether the first gaze 1000 and the second gaze 1100 are detected.

FIG. 8 is a diagram for a display area according to a different embodiment of the present specification.

As mentioned earlier in FIG. 5 to FIG. 6, the display module 2000 according to one embodiment of the present specification can display a graphic image like a folded visual content in a boundary between a first display area 4100 and a second display area 4200. And, the analysis module 2300 according to one embodiment of the present specification can scroll a visual content included in the first display area 4100 and a visual content included in the second display area 4200, respectively by a touch gesture of a user of a first gaze 1000 and a touch gesture of a user of a second gaze 1100.

If the speed of watching the visual content of the user of the second gaze 1100 is remarkably fast or an amount of the visual content currently displayed is not that big, the user of the second gaze 1100 may finish watching the visual content included in the second display area 4200 while the user of the first gaze 1000 is still watching the visual content included in the first display area 4100. In this case, although the user of the second gaze 1100 inputs a touch gesture signal for the second display area 4200, the visual content may not be scrolled. And, the analysis module 2300 according to one embodiment of the present specification can judge whether the user of the second gaze 1100 has finished reading the visual content included in the second display area 4200 in a manner of detecting the second gaze 1100 irrespective of the touch gesture signal of the user. Subsequently, the display module 2000 according to one embodiment of the present specification can display a third display area to provide a new visual content to the user of the second gaze 1100.

FIG. 8(*a*) corresponds to a case that the display area 8000 according to one embodiment of the present specification displays the first display area 4100 and the second display area 4200. FIG. 8(*a*) indicates a case that the first display area 4100 and the second display area 4200 are divided by the graphic image explained earlier in FIG. 5 to FIG. 6. As depicted in FIG. 8(*a*), if the user of the second gaze 1100 finishes reading the visual content included in the second display area 4200, although the user of the second gaze 1100 inputs a touch gesture signal for the second display area 4200, the visual content may not be scrolled. And, the analysis module 2300 according to one embodiment of the present specification can judge whether the user of the second gaze 1100 has finished reading the visual content included in the second display area 4200 in a manner of detecting the second gaze 1100 irrespective of the touch gesture signal of the user. In this case, the first display area 4100 can provide a visual content independent of the second display area 4200. The user of the first gaze 1000 is able to watch the visual content irrespective of a state of the user of the second gaze 1100.

FIG. 8(*b*) is a diagram for a third display area 8100 to provide a new content to the user of the second gaze 1100. If it is judged that the user of the second gaze 1100 has finished watching the visual content currently displayed in the second display area 4200, the display module 2000 according to one embodiment of the present specification can display the third display area 8000 to provide a new visual content. In this case, since the user of the first gaze 1000 is still watching the displayed visual content, the display module 2000 according to one embodiment of the present specification can provide the existing visual content in a manner of changing a size of the first display area 4100. Hence, the display area can include a size-changed first display area 8000 and the third display area 8100.

The size-changed first display area 8000 and the third display area 8100 may include visual contents different from each other in a type and content, respectively. And, the analysis module 2300 can scroll the visual contents included in the first display area 8000 and the third display area 8100 with a speed different from each other.

Figure 9:
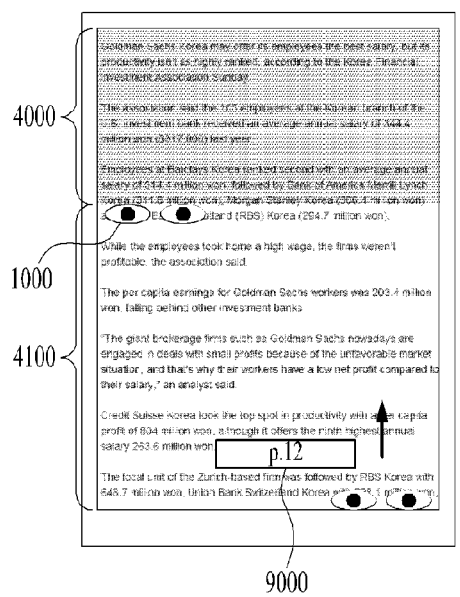
FIG. 9 is a diagram for an indicator according to a different embodiment of the present specification.

FIG. 9 is a diagram for an indicator according to a different embodiment of the present specification.

FIG. 9 indicates a case that the visual content included in the display area according to one embodiment of the present specification corresponds to text content. As depicted in FIG. 9, in case of the text content, the display area can include a scroll area 4000 and a first display area 4100 as well. In this case, the display module 2000 according to one embodiment of the present specification can display an indicator 9000 indicating a page of the currently displayed text content in the latter part of a last sentence of the text content displayed in the first display area 4100. The indicator 9000 indicating the page of the text content can be represented by at least one selected from the group consisting of a line, light and shade, number, and a graphic. This is modifiable according to intention of a designer.

Figure 10:
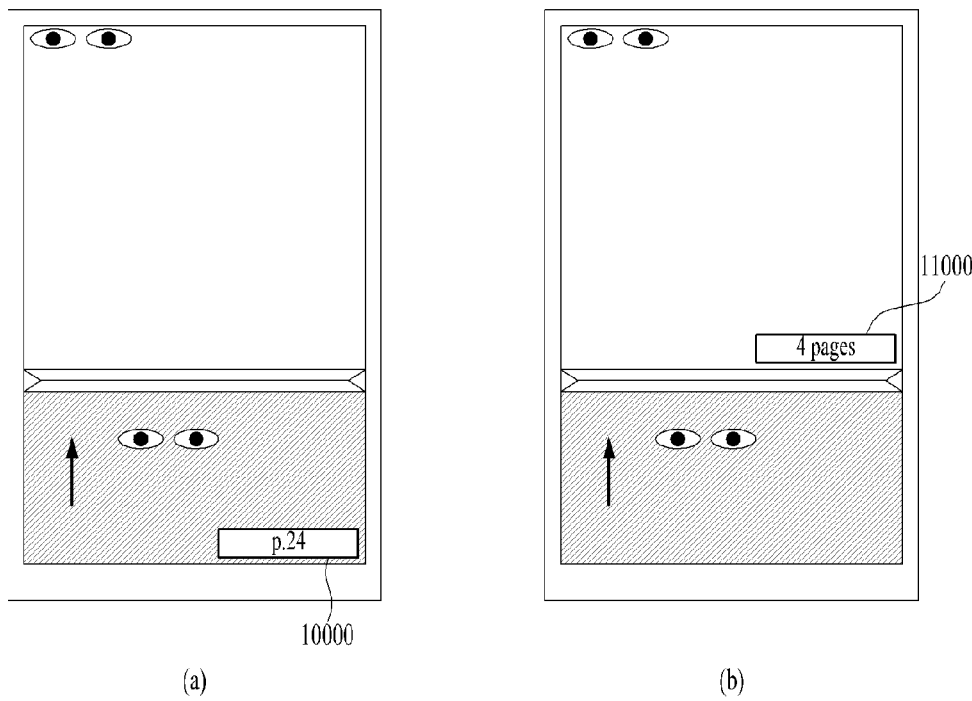
FIG. 10 is a diagram for an indicator according to a further different embodiment of the present specification.

FIG. 10 is a diagram for an indicator according to a further different embodiment of the present specification.

As mentioned earlier in FIG. 4 to FIG. 6, FIG. 10 corresponds to a case that text content is scrolled according to a touch gesture signal. FIG. 10 indicates a case that a graphic image like folded text content is displayed in a boundary between the first display area and the second display area.

As mentioned in the foregoing description, the first display area can include text content for the user of the first gaze and the second display area can include text content for the user of the second gaze. The text content included in the first display area and the text content included in the second display area can be independently scrolled by each user. Hence, the first display area and the second display area may include a part different from each other of a text content corresponding to an identical page. Or, the first display area and the second display area may include a text content corresponding to a page different from each other. Hence, if a page of the text content included in the first display area and a page of the text content included in the second display area are different from each other, the display module 2000 according to one embodiment of the present specification can display an indicator. In the following description, both an indicator depicted in FIG. 10(*a*) and an indicator depicted in FIG. 10(*b*) are explained.

The indicator 10000 depicted in FIG. 10(*a*) is an indicator displayed in the latter part of a last sentence of the text content included in the second display area and indicates a page number of the text content currently included in the second display area. The indicator depicted in FIG. 10(*a*) can be represented by at least one selected from the group consisting of a line, light and shade, number, and a graphic. This is modifiable according to intention of a designer.

As mentioned in the foregoing description, since the speed of watching the text content of the user of the first gaze is slower than the speed of watching the text content of the user of the second gaze, the page number of the text content included in the second display area is greater than the page number of the text content included in the first display area. Hence, when the first display area and the second display area are displayed, the display module 2000 according to one embodiment of the present specification can display the indicator 10000 indicating the page number of the text content currently included in the second display area in the latter part of the last sentence of the text content included in the second display area.

If a page of the text content included in the first display area and a page of the text content displayed in the second display area are different from each other, the indicator 11000 depicted in FIG. 10(*b*) indicate a difference between the page of the text content included in the first display area and the page of the text content displayed in the second display area. The indicator depicted in FIG. 10(*b*) can be represented by at least one selected from the group consisting of a line, light and shade, number, and a graphic. This is modifiable according to intention of a designer. And, if the difference between the page of the text content included in the first display area and the page of the text content displayed in the second display area is greater than a predetermined value, the indicator depicted in FIG. 10(*b*) may indicate a summary of the text content corresponding to the page difference between the text content included in the first display area and the text content included in the second display area. This is modifiable according to intention of a designer.

Figure 11:
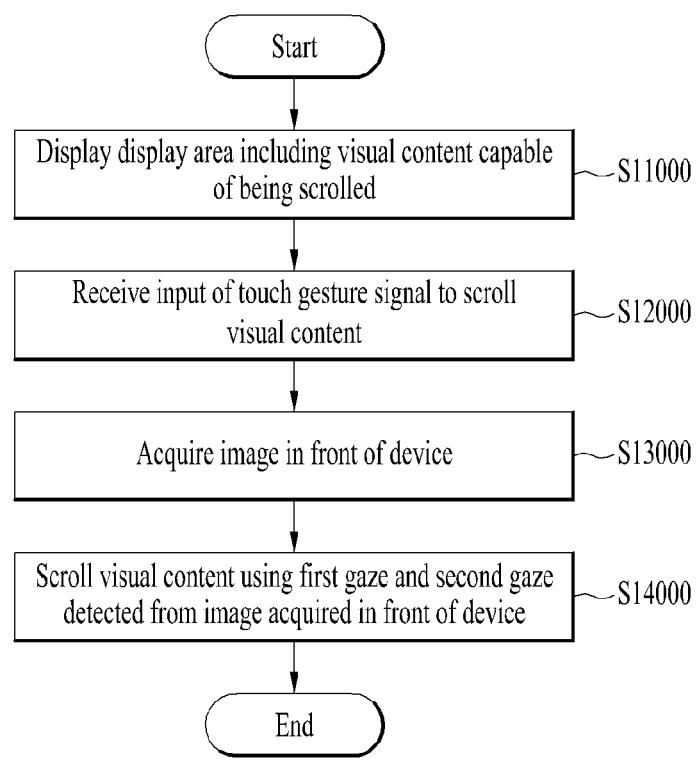
FIG. 11 is a flowchart of a method of recognizing multi-gaze according to one embodiment of the present specification.

FIG. 11 is a flowchart of a method of recognizing multi-gaze according to one embodiment of the present specification.

As mentioned earlier in FIG. 2, the display module 2000 according to one embodiment of the present specification can display a display area including a visual content capable of being scrolled [S11000]. The visual content according to one embodiment of the present specification may mean the visual content including a picture, a photo, a text, and the like.

Subsequently, the input module 2100 according to one embodiment of the present specification can receive an input of a touch gesture signal to scroll the visual content [S12000]. The touch gesture signal may include a multi-touch gesture signal. Various touch gesture signals can be used according to intention of a designer. And, all or a part of the visual content according to the present specification can be scrolled according to a touch duration of a touch gesture signal, and the like.

The image acquisition module 2200 according to one embodiment of the present specification can acquire an image in front of a device [S13000].

Subsequently, the analysis module 2300 according to one embodiment of the present specification detects a first gaze and a second gaze from the image acquired in front of the device and can scroll the visual content using the detected first gaze and the second gaze [S14000].

As mentioned earlier in FIG. 3 to FIG. 4, the first gaze determines a maximum amount of a scroll area to scroll the visual content and the second gaze can determine whether an event initiating a scroll occurs.

If the speed of watching content of a user 1 and the speed of watching content of a user 2 are different from each other, a position of the first gaze corresponding to the gaze of the user 1 may be located at the top of a position of the second gaze corresponding to the gaze of the user 2 in the display area. A content included in the display area located at the top of the position of the first gaze means that the content has already been watched by both the user 1 and the user 2. In particular, although the corresponding area is scrolled by one of the user 1 and the user 2, since the visual content displayed in the scrolled area is already seen by all users, there is no inconvenience or problem in watching the displayed visual content. Hence, the analysis module 2300 according to one embodiment of the present specification can determine a maximum amount of the scroll area to scroll the visual content on the basis of the position of the first gaze. In particular, the visual content included in the scroll area can be scrolled within the determined maximum amount according to a touch gesture signal of a user.

In this case, if it is judged that the position of the second gaze 1100 is located within a scroll initiation area, the analysis module 1100 according to one embodiment of the present specification can initiate a scroll according to a touch gesture signal. The scroll initiation area according to one embodiment of the present specification corresponds to an area to initiate a scroll when a touch gesture signal of a user is inputted. The scroll initiation area may be included in the display area.

If the visual content is scrolled according to the touch gesture signal of the user, the display module 2000 according to one embodiment of the present specification can display a second display area including a visual content to provide a user of the second gaze with the visual content.

A detail process of scrolling the visual content follows the embodiments explained earlier in FIG. 4 to FIG. 10.

A display area according to one embodiment of the present specification can include a scroll area. The display area can include a first display area where an amount of the first display area is determined by the first gaze and the second gaze. And, the display area according to one embodiment of the present specification can include a second display area according to a touch gesture signal of a user. A scroll initiation area can be included in the first display area and may be positioned at the top or bottom area of the first display area including a boundary of the first display area.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A touch-enabled multi-gaze recognition apparatus, comprising:
    a display device configured to display a display area containing a visual content and configured to sense a touch from a user;
    an input module configured to receive the sensed touch as an input of a touch gesture signal to scroll the visual content;
    an image acquisition module configured to acquire an image in front of the multi-gaze recognition device while at least two users are in front of the device, the acquired image comprising a first gaze and a second gaze, each gaze corresponding to each user, and wherein the image acquisition module is further configured to determine a first specific position within the display area corresponding to the first gaze and a second specific position within the display area corresponding to the second gaze;
    and an analysis module configured to:
    determine a distance of the touch gesture signal;
    determine a distance of the first specific position from an edge of the display area; and
    define, within the display area, a scroll area and a first display area, wherein the scroll area is based on the distance of the first specific position from the edge of the display area, and wherein the first display area is a portion of the display area that does not include the scroll area; and
    if the second specific position is located within a scroll initiation area when the touch gesture signal is received:
        scroll the visual content by an amount, the amount being based on the smaller of the distance of the touch gesture signal and the distance of the first specific position from the edge of the display image; and
    if the second specific position is not located within the scroll initiation area when the touch gesture signal is received:
        ignore the touch gesture signal and maintain the position of the visual content;
    wherein the first display area contains the scroll initiation area.

2. The multi-gaze recognition apparatus of claim 1, wherein the first specific position is located at the top of the second specific position in the display area.

3. The multi-gaze recognition apparatus of claim 2, wherein the analyzer is further configured to detect whether the first gaze or the second gaze disappeared from the image acquired in the front of the multi-gaze recognition apparatus during a prescribed cycle.

4. The multi-gaze recognition apparatus of claim 3, wherein if the first gaze or the second gaze disappeared, the display device is further configured to display an indicator indicating a last position corresponding to a lastly detected first gaze or a lastly detected second gaze.

5. The multi-gaze recognition apparatus of claim 1, wherein if the visual content is scrolled, the display device is further configured to display a second display area containing a visual content identical to or different from the visual content contained in the first display area, wherein the second display area is contained in the display area, and wherein an amount of the second display area is determined according to the touch gesture signal.

6. The multi-gaze recognition apparatus of claim 5, wherein the display device is further configured to display a graphic image indicating that the visual content is folded in a boundary between the first display area and the second display area.

7. The multi-gaze recognition apparatus of claim 5, wherein if the visual content is scrolled as much as a maximum amount of the scroll area according to the touch gesture signal, the display device is further configured to display a graphic image indicating that the visual content is folded in a boundary between the first display area and the second display area.

8. The multi-gaze recognition apparatus of claim 5, wherein if a distance between a position of the first gaze in the first display area and a position of the second gaze in the second display area is greater than a predetermined value, the display, device is further configured to display a graphic image indicating that the visual content is folded in a boundary between the first display area and the second display area.

9. The multi-gaze, recognition apparatus of claim 5, wherein if a position of the first gaze corresponds to a border line of the top of the first display area, the display device is further configured to display a graphic image indicating that the visual content is folded in a boundary between the first display area and the second display area.

10. The multi-gaze recognition apparatus of claim 6, wherein if the visual content contained in the second display area is identical to the visual content contained in the first display area, the analyzer is further configured to check whether a user of the second gaze finished reading the visual content.

11. The multi-gaze recognition apparatus of claim 10, wherein if the user has finished reading the visual content, the display device is further configured to display a third display area providing a new visual content.

12. The multi-gaze recognition apparatus of claim 6, wherein the analyzer is further configured to scroll the visual content contained in the first display area and the visual content contained in the second display area with a speed different from each other.

13. The multi-gaze recognition apparatus of claim 1, wherein if the visual content corresponds to a text content, the display device is further configured to display an indicator indicating a next page of the text content in the latter part of a last sentence of the text content.

14. The multi-gaze recognition apparatus of claim 13, wherein if the text content is scrolled, the display device is further configured to display a second display area containing a text content identical to or different from a text content contained in the first display area, wherein the second display area is contained in the display area, and wherein an amount of the second display area is determined according to the touch gesture signal.

15. The multi-gaze recognition apparatus of claim 14, wherein the display device is further configured to display a graphic image indicating that the visual content is folded in a boundary between the first display area and the second display area.

16. The multi-gaze recognition apparatus of claim 15, wherein if a page of the text content contained in the first display area is different from a page of the text content contained in the second display area, the display device is further configured to display the indicator in the latter part of a last sentence of the text content contained in the second display area.

17. The multi-gaze recognition apparatus of claim 15, wherein the display device is further configured to display an indicator indicating a page difference between the text content contained in the first display area and the text content contained in the second display area and wherein the indicator indicating the page difference of the text content is represented by at least one selected from the group consisting of a line, light and shade, number, and a graphic.

18. The multi-gaze recognition apparatus of claim 13, wherein if a page difference of the text contents contained in the first display area and the second display area is greater than a predetermined value, the display device is further configured to display an indicator indicating a summary for the text content corresponding to the page difference of the text contents contained in the first display area and the second display area.

19. A method of recognizing multi-gaze, comprising:
displaying a display area containing, a visual content;
receiving an input of a touch gesture signal to scroll the visual content;
acquiring an image in front of a multi-gaze recognition device comprising a first gaze and a second gaze, wherein the first gaze corresponds to a first specific position within the display area and the second gaze corresponds to a second specific position within the display area, and wherein the first and second gazes correspond to two respective users that are simultaneously in front of the multi-gaze recognition device when the image is acquired;
determining a distance of the touch gesture signal;
determining a distance of the first specific position from an edge of the display area; and
defining, within the display area, a scroll area and a first display area, wherein the scroll area is based on the distance of the first specific position from the edge of the display area, and wherein the first display area is a portion of the display area that does not include the scroll area; and
if the second specific position is located within a scroll initiation area when the touch gesture signal is received:
scrolling the visual content by an amount, the amount being, based on the smaller of the distance of the touch gesture signal and the distance of the first specific position from the edge of the display image; and
if the second specific position is not located within the scroll initiation area when the touch gesture signal is received:
ignoring the touch gesture signal and maintaining the position of the visual content;
wherein the first display area contains the scroll initiation area.

* * * * *